Figure 1:
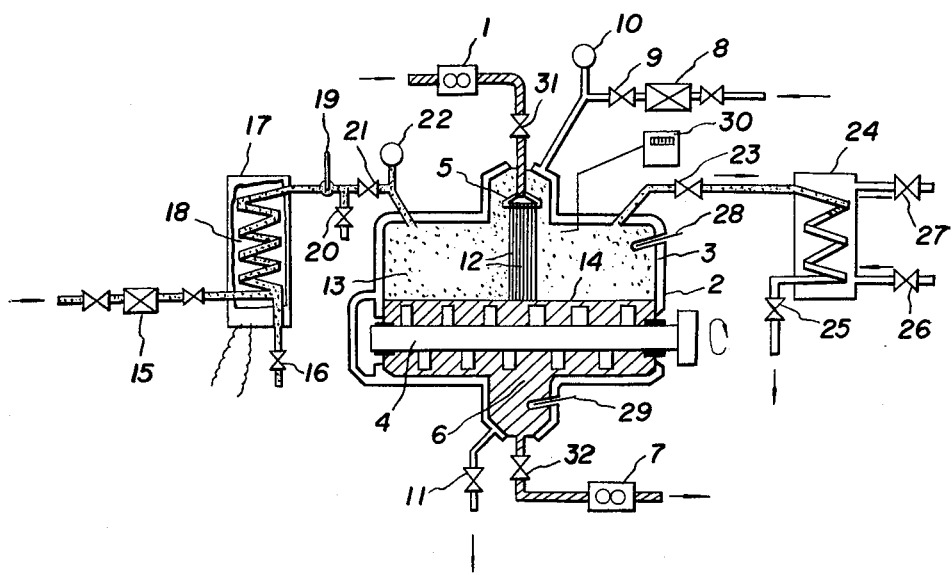

United States Patent Office 3,230,691
Patented Jan. 25, 1966

3,230,691
METHOD FOR CONTINUOUSLY DEFOAMING CONCENTRATED AQUEOUS SOLUTIONS OF POLYVINYL ALCOHOL
Hirotoshi Kurashige, Kurashiki, Japan, assignor to Kurashiki Rayon Company Limited, Kurashiki, Japan, a corporation of Japan
Filed Mar. 8, 1963, Ser. No. 263,969
Claims priority, application Japan, Mar. 15, 1962, 37/9,673
5 Claims. (Cl. 55—54)

The present invention relates to a method of continuously defoaming a concentrated (thick) aqueous solution of polyvinyl alcohol or consisting mainly of polyvinyl alcohol, the said method having the following special feature; namely, in the manufacture of the concentrated aqueous solution of 20–60% concentration consisting solely or mainly of practically uniform and foamless polyvinyl alcohol used in the molding of slivers, films, belts, etc., by a dry process or a semi-fusion process, the thick aqueous solution consisting solely or mainly of polyvinyl alcohol dissolved by the continuous extruding-dissolving machine, such as the extruder, or Ko-kneader (the semi-screw type extruding-dissolving machine manufactured by a company in Switzerland), or by the batch-type dissolving tanks, etc., is continuously led into the defoaming chamber, which is filled with super-heated, saturated, or super-saturated steam, and retained in the said chamber for a certain length of time, after which the thick aqueous solution of polyvinyl alcohol or consisting mainly of polyvinyl alcohol is continuously extracted from the said chamber, whereby the thick aqueous solution of polyvinyl alcohol or consisting mainly of polyvinyl alcohol may be continuously defoamed, or continuously defoamed and at the same time continuously concentrated or diluted.

The method of manufacturing thick aqueous solution of polyvinyl alcohol referred to above may be roughly classified into a continuous extruding-dissolving method of the screw or semi-screw type by the use of extruder or Ko-kneader, and a batch-type dissolving method by the use of totally enclosed dissolving tanks equipped with the enclosed kneader or agitating device. In either of the cases, the mixing of air bubbles into the solution causes serious troubles in case of a highly concentrated polyvinyl alcohol. In fact, the greatest problem in the preparation of thick aqueous solution of polyvinyl alcohol has conventionally been, under what conditions the dissolution of polyvinyl alcohol should be carried out without introducing air bubbles. Particularly in the case of a thick aqueous solution of polyvinyl alcohol of a concentration of over 30%, the solution shows a very high degree of viscosity and as a result, once air bubbles enter into the solution, it is extremely difficult to move such air bubbles. Thus, it has usually been very difficult to defoam such concentrated polyvinyl alcohol solution after air foams were formed in it, and it has been considered impossible to carry out a continuous defoaming of such solution.

Heretofore, therefore, in the continuous extruding dissolving method for carrying out the dissolution of the hydrous polyvinyl alcohol in flake, chip or pellet forms, the unavoidable prerequisite condition was to carry out the dissolving process in such a way that no air foams may be mixed in. This imposed considerably severe restrictions upon the efficiency of dissolution and the operating conditions. In the operation of the extruder or the Ko-kneader, for instance, the amount of mixing of air foams increases in direct proportion to the increase in the amount of dissolution, thus putting limitations on the dissolving capacity of the dissolving machine, and, in order to reduce such mixing of air foams, it is necessary to maintain at a relatively high level the temperature of the barrel heating zone relatively close to the hopper, and as a result the operational safety of the dissolving machine is unavoidably lowered, as is also, at the same time, the operational safety of the molding-finishing process using the solution thus dissolved. If in this case it were possible to carry out a continuous forced defoaming of the concentrated solution, then it would suffice for the dissolving machine such as an extruder or a Ko-kneader to carry out only the dissolving operation without considering the problem of the mixing of air foams, since the continuous defoaming operation to be carried out in succession to the dissolving process would produce a practically foamless solution. This would result in a large increase in the dissolving capacity of the dissolving machine, and at the same time the operational safety would be improved due to the relaxed conditions of operation. Furthermore, since the foamless solution would be obtained in a stabilized manner, the operational safety of the apparatus for the molding and finishing of the yarn, film, etc., would also be improved. In addition, the continuous defoaming process may be adopted for the purpose of filtering the air bubbles of the dissolved solution in order to prevent the lowering of the molding-finishing efficiency of the yarn and others due to the increased amount of air caused by an accidentally generated unstable condition of operation even where practically or nearly foamless solutions are obtained under normal operating conditions. The continuous defoaming process described above would thus have very large advantages.

As the ordinarily used method of removing foams from concentrated solutions of high-molecular materials, there are the stationary defoaming method, the vacuum defoaming method, and the defoaming method by the use of centrifugal force or gravity in which the solution is defoamed while it is flowed in the form of film. The stationary defoaming will either take an extremely long time or will be almost impossible in the case of the thick aqueous solution of polyvinyl alcohol because of the high viscosity of the solution. When the temperature of the solution is lower than 100° C., the solution is likely to start gelation, and therefore it is necessary to maintain it at a temperature higher than 100° C. When the solution is placed under the condition of a reduced pressure, a remarkable escape of moisture is caused, resulting in the filming of the surface of solution as it is gelled. When air is present in the defoaming device, the above-mentioned flowing of the solution in the form of a thin film would make the continuous defoaming operation extremely difficult because of the high viscosity of the solution and the gelation of its surface or the filming of surface due to the escape of moisture. Under these circumstances a continuous defoaming method having a satisfactory operational efficiency has been demanded. The inventors have made extensive investigations of the continuous defoaming method of concentrated aqueous solutions of polyvinyl alcohol and found that a continuous defoaming of a concentrated aqueous solution of polyvinyl alcohol may be easily carried out by leading the said solution into a defoaming chamber filled with saturated or nearly saturated pressure steam and either having the solution stay in the said chamber for a certain length of time, or having the solution stay in the chamber for a certain length of time and at the same time applying a mechanical agitation to the said solution, or ejecting the solution through spinnerets into the pressure steam atmosphere inside the said defoaming chamber, or feeding the solution from above a perforated saucer, a porous plate, a wire screen, or the like installed in the pressure steam atmosphere inside the said defoaming chamber and letting the solution drop downward, and then, after thus bringing the solution into contact with the pressure steam, continuously taking out the solution. The inventors also found that, by making the said pressure steam in the defoaming chamber a super-heated steam or a super-saturated steam, a continuous concentration or a continuous dilution of the said dissolved solution may be carried out simultaneously with the above-mentioned continuous defoaming of it. The inventors have thus accomplished a method of continuous forced defoaming on an industrial scale, of thick aqueous solutions of polyvinyl alcohol.

Figure 2:
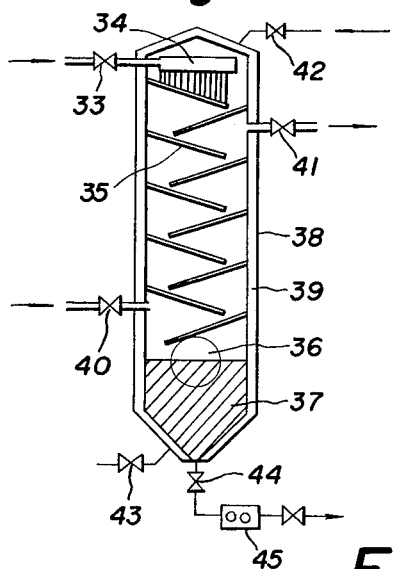
Figure 3:
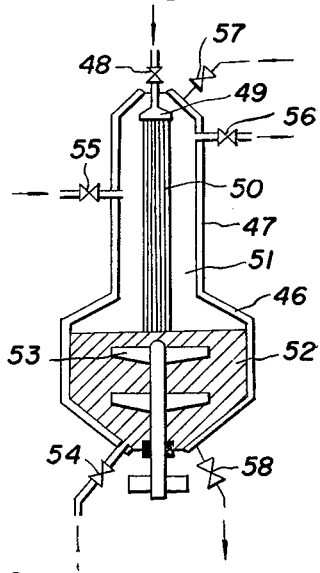
Figure 4:
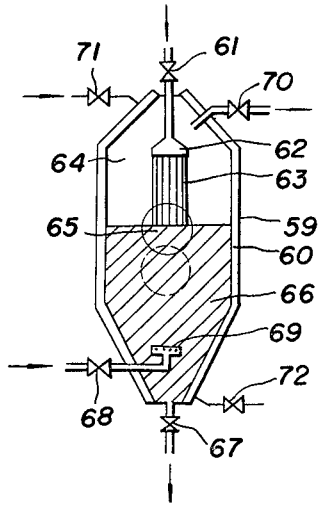

For a better understanding of the invention, reference is taken to the accompanying drawings for illustrating an apparatus for carrying out the method of the invention, in which FIG. 1 is a diagrammatic sectional view of an apparatus, and FIGS. 2-4 show longitudinal sectional views of modified forms of the defoaming chamber.

The basic theory of the invention will now be explained with reference to an apparatus shown in FIG. 1, wherein 2 shows the main body of the defoaming chamber, which may be kept warm by the steam jacket 3. The agitating device 4 is provided at the lower part of the defoaming chamber main body 2. The thick aqueous solution of polyvinyl alcohol containing air foams and dissolved air, obtained by dissolution in the continuous extruding-dissolving machine such as an extruder or a Kokneader, or in batch-type dissolving tanks, is injected into the saturated or nearly saturated pressure steam atmosphere 13, in successive instalments of a practically definite quantity each, in the shape of filaments 12, through the fine holes of the spinneret 5 through the valve 31 by means of a gear pump 1, and a definite quantity of the solution 6 is retained in the said defoaming chamber main body for a definite period of time, the said solution 6 being maintained at a definite suitable level in the said main body, shown at 14 for instance, and the agitating device 4 is rotated to apply mechanical agitation to the said retained solution. The defoamed solution is extracted through the lower part of the main body through the valve 32 by the gear pump 7, at the same rate as the feeding of the solution into the main body. In this way the continuous foam-removing operation may be carried out. The pressure steam, with its pressure adjusted by the pressure adjusting valve 8, is fed through the valve 9 into the jacket 3 of the main body, and extracted through the valve 11. The said steam heats the main body and keeps it warm. After the pressure of the pressure steam is adjusted by the pressure adjusting valve 15, the steam is super-heated through the steam super-heater 17 which is heated by the electric heater 18, and, passing through the thermometer 19, the valve 21 and the pressure gauge 22, is led directly into the upper part of the defoaming chamber main body. The inside of the said main body is thus subjected to pressure of steam 13 filled therein. The piping between 15 and 22 should be kept sufficiently warm and, at the starting of operation, the steam drain is removed well through the drain valves 16 and 20. The steam is extracted successively, in a definite quantity at a time, through the valve 23, while maintaining the pressure of the pressure steam in the said main body at a definite value, the extracted steam is cooled by water in the steam condenser 24, and the flow of cooling water to steam condenser 24 is controlled by valves 26, 27. The steam is thus condensed, and then removed through the valve 25. The amount of steam extraction is regulated by measuring the amount of drain. 28 is a thermometer for measuring the temperature of the pressure steam in the main body. 29 is a thermometer for measuring the temperature of the solution retained in the main body. 30 is a device for measuring the humidity of the pressure steam in the main body.

Thus, the pressure steam is suitably heated by the steam super-heater and then fed into the defoaming chamber, and the main body of the defoaming chamber is heated and kept warm by the steam circulated in the jacket of the main body. While maintaining the pressure steam inside the main body at a definite pressure, the steam is extracted in successive suitable quantities. The saturated or nearly saturated steam condition can be maintained by the selection of suitable conditions of the feed steam pressure (pressure of the pressure steam in the defoaming chamber), the super-heated degree of the feed steam, the pressure of the steam in the jacket of the main body of the defoaming chamber, and the amount of extraction of the pressure steam in the said main body.

The maintaining of the pressure steam atmosphere in the defoaming chamber in the saturated or nearly saturated condition as described above may be carried out with relative ease by manually adjusting the various conditions mentioned above while measuring the humidity of the said pressure steam atmosphere in the defoaming chamber by means of the hygrometer. However, a more perfect control of the conditions may be attained by means of automatic control by connecting the said hygrometer with the heater of the steam super-heater, or by connecting the said hygrometer with the steam extracting valves, or by connecting the said hygrometer with the heater of the steam super-heater and with the steam extracting valves. The level of the solution retained in the defoaming chamber may be adjusted through a peep-hole, or more perfectly through automatic control, to be maintained at suitable position.

The solution containing air bubbles and dissolved air, to be fed into the defoaming chamber through the gear pump 1, is heated up, before feeding, to the temperature approximately equal to that of the thermometer 29 of the retained solution in the defoaming chamber, by passing it through a pipe having a heating jacket. The filament-like solution 12 and the retained solution 6 in the defoaming chamber receive or give away practically no moisture if the pressure steam atmosphere 13 in the main body is in the saturated or near-saturated condition, which means that the solution fed into the chamber is neither concentrated nor diluted, and thus no change in the concentration of the solution takes place during this defoaming process. The air bubbles in the dissolved solution injected into the steam atmosphere as a solution in the form of filaments through the fine holes of the spinneret 5 are destroyed by the steam as the solution passes through the steam immediately after it is ejected, and the air in the said air bubbles escapes into the steam atmosphere. The greatest part of air bubbles may be thus removed in the injecting process of the solution, but, to make it doubly sure, the device as shown in FIG. 1 is additionally employed, when necessary, for a mechanical agitation of the retained solution. The residual air bubbles in the retained solution are compulsorily brought to the surface of the solution by agitation and, at the surface of contact with the steam, destroyed by the steam or by the mechanical agitation. The air in these air bubbles escapes also into the steam atmosphere and is removed together with extracted steam. When the defoaming operation is practically completed, the pressure steam atmosphere in said defoaming chamber no longer contains any air, and therefore, even if mechanical agitation is subsequently applied to the retained solution, there is no liklihood at all of the solution containing air bubbles again. The above-mentioned defoaming process is naturally accompanied, simultaneously, by the phenomenon of de-aeration due to diffusion wherein the dissolved air in the solution moves from the solution phase to the steam phase. Since there is no possibility of the surface of solution forming a film when the solution surface is in contact with the pressure steam as in the method of the present invention, the speed of diffusion is much higher than in ordinary cases.

The continuous defoaming operation is carried out on the basis of the theory explained above. Furthermore, simultaneously with the continuous defoaming of the dissolved solution, a continuous concentration or a continuous dilution of the solution is also possible, by making the pressure steam in the main body of the defoaming chamber a super-heated steam or a super-saturated steam. The reason is because, by having the inside of the defoaming chamber filled with a super-heated steam atmosphere, a definite quantity of the moisture in the solution is taken away by the super-heated steam, and thus the moisture in the solution is carried away out of the defoaming chamber system with the extraction of the steam. On the other hand, if the inside of the said chamber is filled with a super-saturated steam atmosphere, the solution will be diluted as moisture is imparted to it due to the condensation of part of the steam. If mechanical agitation is applied to the solution in the course of the above-mentioned concentration or dilution, a more uniformly concentrated or diluted solution will be obtained. However, even if no such agitation is applied, the solution of a practically uniform concentration or dilution may be continuously obtained by making constant the length of time of retention of the solution in the chamber and the conditions of the said concentration or dilution process. This method of concentration or dilution of a thick aqueous solution of polyvinyl alcohol in the steam atmosphere by means of exchange of moisture between the solution and the steam, is highly advantageous in respect of the uniformity of the concentration or dilution of the solution and the ease with which the operation may be carried out, as compared with the method of dilution where water or a dilute aqueous solution is added to and mixed together with the solution, or the method of concentration where the concentration of the solution is carried out by evaporating the moisture of the solution into the air while stirring the solution. The pressure steam atmosphere in the said defoaming chamber may be moved to the super-heated steam side either by increasing the super-heated degree of steam by the steam super-heater or by shifting the conditions in the direction of increasing the amount of extracted steam. On the other hand, in order to move the pressure steam atmosphere to the super-saturated steam side, the super-heated degree of steam by the steam super-heater may be diminished, or the amount of steam extraction may be reduced, or the conditions may be shifted in the direction of lowering the steam pressure in the jacket of the main body, whereby the moving of the atmosphere to the super-saturated steam side may be accomplished relatively easily.

The steam passing inside the jacket of the defoaming chamber main body serves the purpose of heating and keeping warm the interior of the main body. The steam used is normally a pressure steam in the range of about 2–6 kg./cm.$^2$, but, the higher the concentration of the solution, the higher pressure steam is used for the purpose of lowering the viscosity of the solution.

The pressure steam in the main body of the defoaming chamber, which has the function of bringing the dissolved solution into contact with the steam atmosphere for defoaming, has at the same time the additional important functions of preventing, by its steam pressure, the bubbling and spouting, due to boiling, of the retained solution which is maintained at a relatively high temperature, and of forcing out the solution for the purpose of feeding it smoothly to the extraction gear pump when extracting the defoamed solution through the lower part of the main body of the defoaming chamber, by applying pressure to the surface of the retained solution. The pressure of this steam is also adjusted to the range of 2–6 kg./cm.$^2$ usually, like that of the steam in the jacket, but generally, it is adjusted to a pressure approximately equal to or slightly lower than the pressure of the steam in the jacket. For instance, the defoaming operation is carried out by adjusting the pressure in the main body of the defoaming chamber to 3.0–4.0 kg./cm.$^2$ when the steam pressure in the jacket is 4 kg./cm.$^2$. The reason is because, if the steam pressure in the main body is maintained higher than 4.0 kg./cm.$^2$ when the steam pressure in the jacket is 4.0 kg./cm.$^2$, the boiling due to the vapor tension of the retained solution may be suppressed, but in this case it is affected by the concentration of the solution. Even if the steam pressure in the main body is lowered at the concentration of the solution becomes higher, the vapor tension of the solution itself is decreased as its viscosity increases, and thus it will be difficult for the phenomenon of bubbling and spouting due to boiling to take place. For instance, in the case of the polyvinyl alcohol solution (polyvinyl alcohol of a polymerization degree of 1,700) of a high concentration of 35–40%, if the steam pressure in the jacket is 4 kg./cm.$^2$, the steam pressure in the main body may be lowered to 3.5–3.0 kg./cm.$^2$ without causing the bubbling and spouting, due to boiling, of the retained solution.

Thus, the present method is advantageous in that the lower the steam pressure in the main body is within the range where the boiling of the retained solution may be held down, the higher the super-heated degree of steam may be set, and in that the defoaming speed may be increased because the difference between the steam pressure in the main body and the vapor tension of the retained solution is diminished.

The apparatus used for carrying out the method of the invention will now be further described. The defoaming chamber may be a container designed to be heated and kept warm by a steam jacket or by a heater jacket heated by a heating medium. The said container may be of any type, whether vertical, horizontal, cylindrical or box type. The size of the container may be suitably determined in accordance with the desired defoaming capacity, but when using the apparatus as shown for instance in FIG. 3 where the ejecting and feeding of the dissolved solution through the fine holes of spinneret and the mechanical agitation of the retained solution are both carried out, the main body of the defoaming chamber having an inside of 50 lit. has the treating capacity of 0.40 lit./min. in terms of the dissolved original solution, or 230 kg./day (treating capacity in terms of the pure con tent of polyvinyl alcohol in the case of the polyvinyl alcohol solution of a 36% concentration). Thus, in the defoaming method of the present invention, the defoaming chamber of a relatively small measurement has a relatively large treating capacity.

The apparatus having the function of carrying out the defoaming of solution is available in the following various types.

(1) The type of apparatus having the function of retaining the dissolved solution for a definite length of time, without applying a mechanical agitation to the solution, in the defoaming chamber filled with steam under pressure.

(2) The type of apparatus having the function of retaining the dissolved solution for a definite length of time in the defoaming chamber filled with steam under pressure, and applying mechanical agitation to the solution.

(3) The type of apparatus having the function of having pressure steam blown directly into the retained solution from the lower part of the solution, by way of feeding steam into the defoaming chamber, and applying agitation to the said solution by means of the said pressure steam.

(4) The type of apparatus having the function of ejecting the dissolved solution through the fine holes of a round, flat or cylindrical spinneret into the pressure steam atmosphere inside the defoaming chamber, thus feeding the dissolved solution into the defoaming chamber, and bringing the injected solution in the form of filaments into contact with the pressure steam.

(5) The type of apparatus having the function of feeding the dissolved solution into the pressure steam atmosphere of the defoaming chamber from above one or more perforated saucers, porous plates, wire screens, metal plates, or pebble-layers of a suitable size and thickness, installed horizontally or obliquely in a multi-stage construction in the said pressure steam atmosphere and thus allowing the said dissolved solution to drop or flow downward as masses or drops of solution in the pressure steam atmosphere while contacting the pressure steam, or allowing the solution to flow downward as a film-like solution while making the surface of the said film-like solution (6) The type of apparatus having two or more of the functions described in (1) through (5) above.

All of the apparatuses described in (1) through (5) above have the function of defoaming the solution, but actually it is more profitable to use an apparatus of the type having, in one apparatus, two or more of the functions described in (1) through (5), because such an apparatus would perform the continuous defoaming process more perfectly while at the same time shortening the time required for defoaming capacity of the apparatus. Particularly the apparatus capable of applying mechanical agitation to the retained solution in the defoaming chamber is profitable in the case of the concentration of polyvinyl alcohol being as high as 35–60%, or in the case of using polyvinyl alcohol of a high degree of polymerization, or in the case of using polyvinyl alcohol polymerized at low temperature, because the use of such an apparatus in these cases will improve the dissolubility of the polyvinyl alcohol still further and produce a more uniformly defoamed solution. The agitating device in such an apparatus should preferably be of the type capable of satisfactorily stirring and mixing the retained solution in the vertical direction, which would increase the defoaming effect.

The method of continuous defoaming, or continuous defoaming simultaneously with continuous concentration or dilution, of the present invention is not only applicable to the thick aqueous solution consisting solely of polyvinyl alcohol, but also to thick aqueous solutions consisting mainly of polyvinyl alcohol with such admixtures as inorganic or organic acids, or inorganic salts, surface active agents, and anti-oxidizing agents, titanium oxide, various pigments and dyes, such as zinc sulfate, magnesium sulfate, copper sulfate, salicylic acid, oxalic acid, ammonium sulfate, ethylene urea, urea, borax, periodic acid, and sodium periodide, as well as polyacrylic acid, carboxymethyl-cellulose, starch, and such water-soluble high-molecular substances as amino-acetalized polyvinyl alcohol and other derivatives of polyvinyl alcohol, and emulsion particles of water-insoluble high molecular substances such as polyvinyl pyridine and polyvinyl formal.

As described above, the invention provides a defoaming method of high molecular solutions which is quite different from the conventional methods such as the stationary defoaming method and the defoaming method using the centrifugal force or gravity by which the solution is streamed in the form of film. The method of the invention performs the defoaming operation by bringing the said polyvinyl alcohol solution, in the form of filamental-like solution, film-like solution, drops of solution, or masses of solution, into contact with steam in the atmosphere of steam (water) which is a solvent for polyvinyl alcohol, or bringing the solution into contact with the steam at the surface of the solution retained in the steam atmosphere or at the surface of the agitated solution of the said retained solution, whereby extracting the dissolved air contained in the solution by means of the action of diffusion and at the same time destroying the air foams contained in the solution by means of the pressure of pressure steam, the mechanical force of agitation, or the vapor pressure of the high temperature solution itself, thus letting the air in the air foams fly away into the steam atmosphere and then extracting the said steam out of the defoaming chamber. The air in the solution is thus removed outside the defoaming chamber system. Upon completion of this defoaming operation, no air at all exists in the said defoaming chamber, so that, even if mechanical agitation is applied to the retained solution after the completion of the defoaming operation, there is no possibility of the solution coming to contain air foams again. The pressure steam in the defoaming chamber may either be saturated steam, super-heated steam, or super-saturated steam. Any of these steams has the defoaming effect. When ordinarily it is desired not to cause change in the concentration of the solution, the steam may be maintained in a practically saturated or approximately saturated condition. The pressure of the pressure steam in the defoaming chamber may be held at a low level but in the range capable of overcoming the boiling of the retained high temperature solution due to its own vapor pressure, thus minimizing the difference between the vapor pressure of the high temperature solution itself and the pressure of the pressure steam and maintaining a condition in which the air foams may be easily destroyed. The defoaming method of the present invention is different from the conventional stationary method in that, in the former method, the air foams in the solution of high concentration and viscosity are brought to the neighborhood of the interface between the solution and the steam by mechanical force without waiting for them to come up spontaneously, and the said air foams are destroyed and removed in the neighborhood of the said interface.

In short, the defoaming method of the present invention is entirely different from conventional methods in that it performs defoaming, and that continuously, of the thick aqueous solution of polyvinyl alcohol containing air foams by bringing such solution into contact with steam and performing the destruction of air foams and diffusion of air in the neighborhood of the interface of contact between the solution of the steam. The invention will be explained with reference to several examples of its embodiment as follows:

*Example 1*

Polyvinyl alcohol in the form of flakes, of the average polymerization degree of 1,700, with its humidity adjusted to a moisture content of 60%, was continuously dissolved at a speed of 250 cc./min. by an extruder having a barrel bore of 80 mm. The polyvinyl alcohol solution thus obtained was of a concentration of 39.8% as actually measured, and found to contain a considerable quantity of air foams.

The continuous defoaming apparatus having an inside capacity of 80 lit., as shown in FIG. 1, was used. Pressure steam was circulated in the jacket 3 of the defoaming chamber of the apparatus, through valves 9 and 11, to heat and keep hot the main body 2. The stream pressure in the jacket was maintained constant at 4.0 kg./cm.$^2$. At the same time the pressure steam was heated to about 160–170° C. by the steam super-heater 17 and fed into the defoaming chamber through the valve 21. While maintaining the pressure of the pressure steam in the chamber constant at 3.5 kg./cm.$^2$, a condition was maintained in which the said steam could be extracted through the valve 23 and further through steam condenser 24 cooled by water, and thus the condensed water resulting from the condensation of the steam could be continuously extracted through the valve 25. The thick solution containing air foams was passed through the inside of a certain length of the double pipe having the steam heating jacket and thus adjusted to a temperature of 130° C., and then ejected, in the form of the filament-like solution 12, into the pressure steam atmosphere in the defoaming chamber through the fine holes of the spinneret 5 having 50 such fine holes of 1 mm. in diameter, at a constant feeding speed of 220 cc./min., by the gear pump 1. A constant quantity of about 35 lit. of the solution thus fed into the defoaming chamber was retained in the chamber and a continuous mechanical agitation was applied to the retained solution by rotating the agitating device 4 at 25 r.p.m. While being thus agitated, the retained solution was continuously extracted from the lower part of the defoaming chamber through the valve 32 by the action of the gear pump 7 at a constant speed of 220 cc./min., thus carrying out the continuous defoaming operation. The thick aqueous solution of polyvinyl alcohol, thus defoamed, was found to be perfectly foamless, with a highly satisfactory transparency and a uniform concentration, and furthermore, the said concentration was 39.6–39.8%, or about equal to the concentration of the thick solution charged into the defoaming chamber for treatment.

*Example 2*

The hydrous flake-form polyvinyl alcohol of the average degree of polymerization of 1,700, adjusted to a moisture content of 56%, was continuously dissolved at a speed of 180 cc./min. by an extruder having a barrel bore of 70 mm. Into the thick aqueous solution of polyvinyl alcohol of a concentration of 44% thus obtained, another solution, or the dilute aqueous solution, of a concentration of 18%, of polyvinyl alcohol having the polymerization degree of 1,700, was continuously injected, at the ratio of 0.416 volume part of the dilute solution to 1 volume part of the thick solution. The mixture was subjected to adequate mechanical agitation in a screw-type mixer at 130° C., which produced a thick aqueous solution of polyvinyl alcohol having a virtually uniform concentration of 36.0%. This solution contained a considerable quantity of air foams, and so it was defoamed by the apparatus shown in FIG. 2, having an inside capacity of 60 lit. The solution was continuously charged past valve 33 into the pressure steam atmosphere, practically or approximately saturated, in the form of the filament-like solution, from the upper part of the defoaming chamber, at a speed of 200 cc./min. through the fine holes of the flat spinneret 34 having 100 such fine holes of 1.0 mm. in diameter; in the defoaming chamber 38 wherein ten of the porous plates 35 having numerous holes of 2 mm. in diameter are provided in inclined multi-stages in the pressure steam atmosphere, as shown in FIG. 2. While the solution is brought into contact with the pressure steam in the form of film-like solution or masses or drops of solution, the said solution was dropped or steamed downward, and a constant quantity 37 of about 15 lit. of the solution was retained in the lower part of the defoaming chamber, while the retained solution was continuously extracted at a speed of 200 cc./min. by the gear pump 45 through the valve 44 located at the lower part of the defoaming chamber, thus carrying out the continuous defoaming operation. In the defoaming operation just described, the pressure steam of a definite pressure of 4.0 kg./cm.$^2$ was passed into the jacket 39 of the defoaming chamber by way of valve 42 and out by way of valve 43, while the pressure of the pressure steam in the defoaming chamber was maintained constant at 3.6 kg./cm.$^2$, and, as was the case with Example 1, super-heated steam was supplied through the valve 40, and a suitable quantity of steam was extracted through the valve 41, maintaining at a suitable level the super-heated degree of the super-heated steam supplied and the amount of extraction of the pressure steam in the defoaming chamber, so that the pressure steam in the defoaming chamber was maintained in the practically or approximately saturated condition. The solution continuously extracted by the gear pump 45 had a uniform concentration of 35.7–36.0% of polyvinyl alcohol and a highly satisfactory transparency, and this thick aqueous solution of polyvinyl alcohol was found to contain practically no air bubbles. An aperture shown as 36 may be present.

*Example 3*

The hydrous flake-form polyvinyl alcohol of the average degree of polymerization of 1,200, adjusted to a moisture content of 63.5%, was continuously dissolved at a speed of 400 cc./min. by a Ko-kneader having a barrel bore of 140 mm. The product obtained was a thick aqueous solution of polyvinyl alcohol of a concentration of 36.5%. It was defoamed by the continuous defoaming apparatus, as shown in FIG. 3, having an inside capacity of 50 lit., in the following manner.

The pressure steam having a constant pressure of 4.0 kg./cm.$^2$ was passed in the jacket 47 of the defoaming chamber of the said apparatus for heating the steam entering via valve 57 and leaving via valve 58, while the steam super-heated by the steam super-heater was fed into the main body of the defoaming chamber through the valve 55 and the pressure of this steam was maintained constant at 3.5 kg./cm.$^2$ by the automatically adjusting valve. A condition was maintained in which a definite quantity of about 15 kg./hr. of steam was being extracted continuously through the valve 56. The thick solution containing air foams, referred to above, was passed through a certain length of the inside of the double pipe having the steam heated jacket to adjust the temperature of the solution to 130° C., and then injected via valve 48 in the form of the filament-like solution 50 into the pressure steam atmosphere 51 in the defoaming chamber through the fine holes of the spinneret 49 having 100 such fine holes of 1 mm. in diameter, at a constant charging speed of 350 cc./min. by the gear pump. A constant quantity, about 20 lit., of the charged solution was retained in the defoaming chamber, while a constant quantity of about 350 cc./min. of the solution was continuously extracted by the gear pump through the valve 54 from the lower part of the defoaming chamber, while continuously agitating the solution by rotating the agitator 53 at 25 r.p.m. In carrying out this continuous defoaming operation, the pressure steam in the defoaming chamber was maintained in the practically saturated condition through automatic control by measuring the humidity of the said pressure steam by means of a hygrometer and connecting the hygrometer with the steam super-heater. The temperature of the super-heated steam supplied was in the range of 150–180° C. The thick aqueous solution of polyvinyl alcohol continuously extracted by the gear pump out of the defoaming chamber was found to have a uniform concentration of polyvinyl alcohol of 36.4–36.6%, and practically free from air bubbles.

*Example 4*

95 parts of the flake-form polyvinyl alcohol having the average polymerization degree of 1,200, and 5 parts of the amino-acetalized polyvinyl alcohol (average polymerization degree: 1,200) of the amino-acetalization degree of 50%, were mixed together. The mixture was agitated under heating for three hours in the ordinary batch-type dissolver of an inside capacity of 80 lit., equipped with a steam heating jacket and an agitator, by passing a steam of 3.5 kg./cm.$^2$ in the jacket. The product obtained was a solution of a polymer concentration of 30%, containing a considerable quantity of air foams. The solution was defoamed by the continuous defoaming apparatus having an inside capacity of 50 lit. as shown in FIG. 3, in the following manner.

The pressure steam of a constant pressure of 4.0 kg./cm.$^2$ was passed for heating in the jacket 47 of the defoaming chamber 46 of the said apparatus, while the steam super-heated to a constant temperature of 190° C. by the steam super-heater was fed into the main body of the defoaming chamber and maintained at a pressure of 3.5 kg./cm.$^2$. A condition was maintained in which a constant quantity of steam was being continuously extracted. The above-mentioned solution was adjusted to 130° C. and then, at a charging speed of 200 cc./min., was ejected in the form of the filament-like solution 50 into the pressure steam atmosphere 51 in the defoaming chamber, through the fine holes of the spinneret 49 having 100 such holes of 1 mm. in diameter, by the gear pump. A constant quantity 52 (about 20 lit.) of the charged solution was retained in the said chamber and, while continuously agitating it by the agitator 53 rotating at 25 r.p.m., the solution was continuously extracted through the valve 54 by the gear pump at a constant rate of 200 cc./min. from the lower part of the defoaming chamber. The solution thus extracted was found to be in a concentrated state, having a concentration of 39.6–39.9%, and the concentration was uniform throughout the solution. No air foams at all were found in it.

*Example 5*

The flake-like hydrous polyvinyl alcohol of an average polymerization degree of 1,200, adjusted to a moisture content of 60%, was continuously dissolved at a rate of 200 cc./min. in an extruder having a barrel bore of 70 mm. The thick polyvinyl alcohol solution thus obtained was found to contain a considerable quantity of air foams. The solution was defoamed by the use of the continuous defoming apparatus, shown in FIG. 4, having an inside capacity of 50 lit., in the following manner.

A pressure steam having a constant pressure of 4.0 kg./cm.$^2$ was passed through the valve 71 into the jacket 60 of the defoaming chamber of the said apparatus to heat the main body of the defoaming chamber 59 and then out by way of valve 72. The above-mentioned solution containing air foams was continuously injected by way of valve 61 in the form of the filament-like solution 63 into the defoaming chamber at a charging speed of 180 cc./min. through the fine holes of the spinneret 62 having 50 such holes of 1.0 mm. in diameter. A constant quantity (25 lit.) of the charged solution was retained in the defoaming chamber. An aperture shown as 65 may be present. A super-heated steam of 180° C., with its pressure adjusted to 3.7 kg./cm.$^2$, was directly fed into the retained solution 66 through the valve 68 and the steam jet 69. The pressure steam layer 64 at the upper part of the retained solution was maintained at a steam pressure of 3.5 kg./cm.$^2$, while the pressure steam in the defoaming chamber was continuously extracted through the valve 70 at a constant rate of 30 kg./hr. The retained solution was continuously taken out at a constant speed of 180 cc./min. by a pump through the valve 67, the thick polyvinyl alcohol solution thus taken out to have been continuously concentrated to an approximately uniform concentration of 47.5–47.8%. No air foams at all were found in the solution.

What I claim is:

1. A continuous method of defoaming a concentrated aqueous solution of polyvinyl alcohol which comprises:
   continuously flowing an aqueous polyvinyl alcohol solution of 20–60% concentration containing bubbles and entrapped air through a defoaming zone, the solution flowing therethrough traversing a steam filled region of the defoaming zone in a high surface to volume form;
   introducing steam into the defoaming zone into contact with said flowing solution and withdrawing steam and the air out of the polyvinyl alcohol solution from the steam filled region of the defoaming zone to maintain a steam pressure in the defoaming zone in the range of 2–6 kg./cm.$^2$;
   maintaining in the defoaming zone a body of the polyvinyl alcohol solution at a temperature above about 100° C. in open contact with the steam filled region thereof, the polyvinyl alcohol solution being withdrawn from the defoaming zone by way of said body in an air-free bubble free state;
   the polyvinyl alcohol solution in said body being about in vapor pressure equilibrium with the steam filled region in open contact therewith,
   whereby the air introduced with the polyvinyl alcohol solution is removed therefrom into the steam filled region and the bubbles are destroyed.

2. A method as defined in claim 1 wherein said body of solution is mechanically agitated.

3. A method as defined in claim 1, wherein said aqueous solution is introduced into said zone in the form of continuously flowing filaments.

4. A method as defined in claim 1, wherein said aqueous solution is introduced into said zone in the form of continuously flowing films.

5. A method as defined in claim 1, wherein said steam at a temperature above 100° C. is introduced directly into said body of said solution retained in the defoaming zone.

References Cited by the Examiner

UNITED STATES PATENTS

| | | |
|---|---|---|
| 2,251,296 | 8/1941 | Shipp. |
| 2,607,763 | 8/1952 | Hipkin et al. _____ 55—52 |
| 2,733,192 | 1/1956 | Sage _____ 55—54 |
| 2,753,010 | 7/1956 | Walther _____ 55—53 |
| 2,797,767 | 7/1957 | Brooke et al. _____ 55—52 |
| 2,804,172 | 8/1957 | Sender _____ 55—54 X |
| 2,849,430 | 8/1958 | Amos et al. _____ 159—48 X |
| 2,853,127 | 9/1958 | Sessen. |
| 2,906,367 | 9/1959 | Vandenburgh _____ 55—55 |
| 2,908,652 | 10/1959 | Forrester _____ 55—178 X |
| 2,989,143 | 10/1961 | Hallstrom _____ 55—54 X |
| 3,066,999 | 12/1962 | Nakajo et al. _____ 55—52 X |
| 3,103,406 | 9/1963 | Milewski et al. _____ 55—52 |
| 3,130,142 | 4/1964 | Nathan et al. _____ 55—178 |
| 3,134,655 | 5/1964 | Boucher _____ 55—52 |

REUBEN FRIEDMAN, *Primary Examiner.*

B. NOZICK, *Assistant Examiner.*